(No Model.)
I. B. POTTS.
COMBINED DETACHABLE PIPE COUPLING AND BRANCH.
No. 407,683. Patented July 23, 1889.
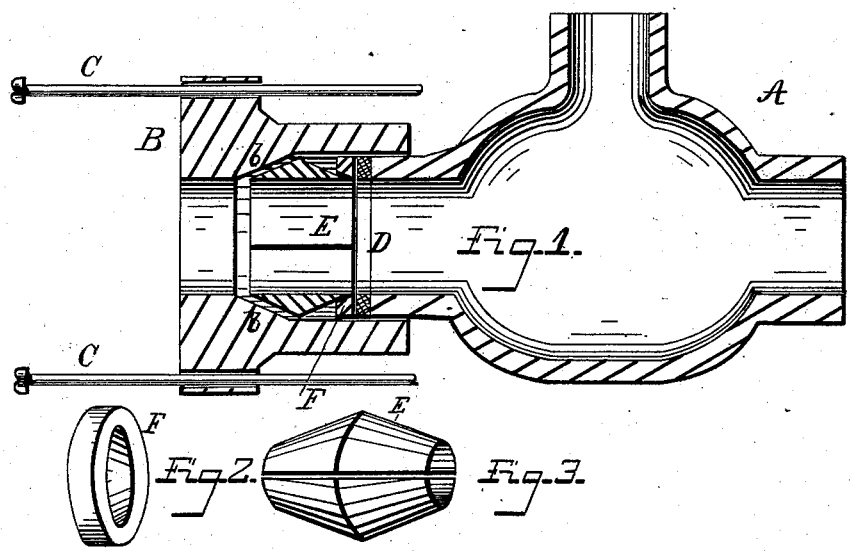
Witnesses
John Bailey Johns.
Wm. H. Brereton
Isaac B. Potts Inventor
By his Attorneys
J. W. Tallmadge

UNITED STATES PATENT OFFICE.

ISAAC B. POTTS, OF COLUMBUS, OHIO.

COMBINED DETACHABLE PIPE COUPLING AND BRANCH.

SPECIFICATION forming part of Letters Patent No. 407,683, dated July 23, 1889.

Application filed March 25, 1889. Serial No. 304,754. (No model.)

*To all whom it may concern:*

Be it known that I, ISAAC BROADWORTH POTTS, a citizen of the United States, residing at Columbus, in the county of Franklin and State of Ohio, have invented a new and useful Improvement in a Combined Detachable Pipe Coupling and Branch, of which the following is a specification.

My invention is an improvement in a combined detachable pipe coupling and branch, angle, or cross branch; and my said invention consists, first, in novel construction of the coupling for uniting the union and pipe, and, second, in certain details of construction and arrangement of the parts, as and for the purposes as will be hereinafter more fully described, and form the subject-matter of the annexed claim.

The object of this invention is to provide a branch, angle, or cross branch for pipe that may be readily applied in position without skilled labor and without cutting screw-threads or the use of solder or wipe joints; and to this end I proceed as follows, reference being had to the accompanying drawings, forming part hereof, wherein—

Figure 1 is a view in central longitudinal sectional elevation of a combined branch and coupling constructed according to my invention; Figs. 2 and 3, detached views of the coupling.

Similar letters of reference indicate like parts in the several views.

The letter A is the combined union and branch; B, the coupling-head; C, the bolts; D, the packing; E, the collar or bushing, and F the ring.

The combined union and branch A may have screw-threaded ends to receive a screw-head, or the said ends may have flanges, or be without flange or screw-thread, as in Fig. 1, and this part A may be cylindrical, or with an enlarged interior, as in Fig. 1, and instead of being a simple branch it may be a cross-branch or angle.

Referring again to Figs. 1, 2, and 3 the coupling there shown consists of a coupling-head B, having a tapered seat *b* therein, a sectional collar or bushing E, with cylindrical interior and externally in the form of a double frustum of a cone having a common base, against which split bushing or collar the head B impinges, and a ring F, having a tapered interior to conform to the taper of the split collar or bushing.

To attach the branch to the ends of a pipe, the head B is first slipped upon the pipe and then the collar E and ring F. The ends of the pipes are then inserted within the part A, a packing applied at the end thereof, and the bolts C inserted in position and screwed up. This action of the bolts draws the head upon the collar E, which collar, being in sections, readily adapts itself to the external diameter of the pipe, and, because of the tapered seat in the head riding upon the incline of the collar, said collar is by the said head clamped upon and around the pipe. At the same time the said collar is driven forward and within the ring F, so that said ring is compressed against the packing, and also by the interior taper of the ring impinging against the incline of the collar this end of the collar is also compressed around the pipe, so that the parts are securely held together and upon the pipe.

Instead of through-bolts being employed to draw the coupling-head, any other suitable means may be used; but the devices shown in Figs. 1, 2, and 3 are in this instance preferred.

The object of forming the branch of an enlarged diameter or oval form is to permit a larger volume to enter the same, so that the exit from the branches will be the same, and, in addition to this, lateral play of the end of the pipe being coupled is permitted.

I claim—

The combination, with the combined union and branch A, of coupling-head B, formed with a tapered seat *b*, collar E in sections and with cylindrical interior and tapered exteriorly from center to each end and fitting against the seat *b* of the head B, ring F, having tapered interior and fitting upon the inner end of collar E, and packing D, interposed between the union and ring F, all constructed and arranged to operate as described.

ISAAC B. POTTS.

In presence of—
WM. H. BRERETON,
HARVEY S. W. DE GAW.